US009915270B2

(12) United States Patent
Fraser et al.

(10) Patent No.: US 9,915,270 B2
(45) Date of Patent: Mar. 13, 2018

(54) TURBOCHARGER COMPRESSOR WITH AN ELLIPTICAL DIFFUSER WALL

(71) Applicant: BorgWarner Inc., Auburn Hills, MI (US)

(72) Inventors: Brock Fraser, Asheville, NC (US); Kurt Henderson, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 323 days.

(21) Appl. No.: 14/762,099

(22) PCT Filed: Jan. 23, 2014

(86) PCT No.: PCT/US2014/012729
§ 371 (c)(1),
(2) Date: Jul. 20, 2015

(87) PCT Pub. No.: WO2014/120549
PCT Pub. Date: Aug. 7, 2014

(65) Prior Publication Data

US 2015/0354587 A1 Dec. 10, 2015

Related U.S. Application Data

(60) Provisional application No. 61/759,479, filed on Feb. 1, 2013.

(51) Int. Cl.

| | |
|---|---|
| ***F01D 9/02*** | (2006.01) |
| ***F01D 9/04*** | (2006.01) |
| ***F04D 29/44*** | (2006.01) |
| ***F03B 1/04*** | (2006.01) |
| ***F03D 1/04*** | (2006.01) |
| ***F04D 29/42*** | (2006.01) |
| ***F04D 17/10*** | (2006.01) |
| ***F01D 25/24*** | (2006.01) |

(52) U.S. Cl.
CPC ......... *F04D 29/4206* (2013.01); *F01D 25/24* (2013.01); *F04D 17/10* (2013.01); *F04D 29/4213* (2013.01); *F05D 2220/40* (2013.01); *F05D 2250/14* (2013.01)

(58) Field of Classification Search
CPC .......................... F04D 29/441; F05D 2250/24
USPC ................................................. 415/204, 206
See application file for complete search history.

(56) References Cited

U.S. PATENT DOCUMENTS 3,905,721 A * 9/1975 Fitzpatrick ............ F04D 29/441 415/181
4,061,188 A * 12/1977 Beck ...................... B60K 11/02 123/41.49
5,066,194 A * 11/1991 Amr ...................... F04D 29/547 165/125

(Continued)

*Primary Examiner* — Deming Wan
(74) *Attorney, Agent, or Firm* — Eric L. Doyle; Stephan A. Pendorf; Patent Central LLC

(57) ABSTRACT

A turbocharger (10) having a compressor housing (15) and a bearing housing (17). The compressor housing (15) including an elliptical shaped wall (16) extending between an air inlet (11) and a volute (13) formed by the compressor housing (15). The bearing housing (17) forms a flat bearing housing wall (14) opposing the compressor wall (16) wherein the compressor wall (16) and bearing housing wall (14) form an elliptical diffuser (12) between the air inlet (11) and the volute (13).

6 Claims, 3 Drawing Sheets

(56) References Cited

U.S. PATENT DOCUMENTS

| | | | | |
|---|---|---|---|---|
| 5,215,437 | A * | 6/1993 | TeVelde .................... | F01D 9/04<br>415/182.1 |
| 5,215,438 | A * | 6/1993 | Chou ...................... | F01D 25/24<br>415/223 |
| 5,372,477 | A * | 12/1994 | Cole ..................... | F04D 29/281<br>415/206 |
| 2008/0267765 | A1 | 10/2008 | Chen | |
| 2010/0178163 | A1 | 7/2010 | Dettmann et al. | |
| 2010/0202877 | A1 | 8/2010 | Sweetland et al. | |
| 2011/0189011 | A1 | 8/2011 | Claus et al. | |
| 2012/0269659 | A1 | 10/2012 | Lischer | |

* cited by examiner

TURBOCHARGER COMPRESSOR WITH AN ELLIPTICAL DIFFUSER WALL

CROSS-REFERENCE TO RELATED APPLICATION

This application claims priority to and all the benefits of U.S. Provisional Application No. 61/759,479, filed on Feb. 1, 2013, and entitled "An Elliptical Compressor Cover For A Turbocharger."

BACKGROUND OF THE INVENTION

Field of the Invention

This invention relates to a turbocharger for an internal combustion engine. More particularly, this invention relates to turbocharger having an elliptical diffuser.

Description of Related Art

A turbocharger is a type of forced induction system used with internal combustion engines. Turbochargers deliver compressed air to an engine intake, allowing more fuel to be combusted, thus boosting an engine's horsepower without significantly increasing engine weight. Thus, turbochargers permit the use of smaller engines that develop the same amount of horsepower as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

Turbochargers typically include a turbine housing connected to the engine's exhaust manifold, a compressor housing connected to the engine's intake manifold, and a center bearing housing coupling the turbine and compressor housings together. A turbine wheel in the turbine housing is rotatably driven by an inflow of exhaust gas supplied from the exhaust manifold. A shaft rotatably supported in the center bearing housing connects the turbine wheel to a compressor impeller in the compressor housing so that rotation of the turbine wheel causes rotation of the compressor impeller. The shaft connecting the turbine wheel and the compressor impeller defines an axis of rotation. As the compressor impeller rotates, it increases the air mass flow rate, airflow density and air pressure delivered to the engine's cylinders via the engine's intake manifold.

The turbine wheel of a turbocharger rotates very fast. The rotation speed of a turbine wheel is size dependent, and smaller turbine wheels can rotate faster than larger wheels. A turbocharger turbine wheel used in conjunction with an internal combustion engine may reach circumferential tip speeds of 530 meters per second. The rapid rotation of the turbine wheel is directly transmitted to the compressor wheel which likewise rotates extremely rapidly. Accordingly, the gas coming off the compressor wheel is moving at a high velocity.

After being accelerated by the compressor wheel, the air proceeds into the diffuser and into the volute housing, before being exhausted at the compressor exit. The diffuser slows down the high-velocity air, largely without losses, so that both pressure and temperature rise. The diffuser accomplishes this increase by essentially forcing the air from the compressor wheel to pass through a narrow passage way. The high velocity air can't get through the narrow channel at low pressure. Thus, the pressure and temperature of the air increases. The diffuser may also have various constrictions or pinches to provide further constriction. The diffuser may have a front pinch, a rear pinch or even a double pinch. Commonly, one wall of the diffuser is formed by the compressor cover face. The other wall is formed by the wall of the compressor housing.

US 2012/0269659 relates to an exhaust-gas turbocharger having a turbine, and having a compressor which has a compressor housing, the compressor housing being fastened to a bearing housing and having a compressor spiral and a bearing-housing-side diffuser wall, wherein the compressor housing is formed as a pressure-die-cast housing, and the diffuser wall is formed as a separate component which can be connected to the compressor housing and which has an internal rounding in the transition region to the inner wall of the compressor housing spiral.

US 2010/0202877 relates to a housing for a turbocharger. The housing has an impeller chamber, diffuser and scroll in fluid communication with each other. The diffuser can have a curved shape and/or a bend in proximity to a tip of the impeller. The curved shape can be defined by one or more radii of curvature. The diffuser can extend in a radial direction that is non-orthogonal to the center line of the turbocharger. The housing can be for a compressor section of the turbocharger.

US 2008/0267765 and U.S. Pat. No. 8,287,233 relate to a centrifugal compressor with a re-circulation venture in ported shroud. An exemplary port includes a first port opening positioned at a location downstream from a compressor wheel, a second port opening positioned at a location adjacent to a blade of the compressor wheel, and a third port opening positioned at a location upstream from the compressor wheel wherein the first port opening and the third port opening define a first flow path and wherein a second flow path extending from the second port opening meets the first flow path at a confluence. The first flow path optionally includes a venturi section, for example, wherein the confluence coincides at least in part with the venturi section. Other exemplary ports, compressor shrouds, systems and methods are also disclosed.

SUMMARY OF THE INVENTION

The present invention provides a diffuser for a turbocharger which is easy to manufacture and still provides the benefits of a diffuser having a smooth curve. It has been discovered that a diffuser having a smooth elliptical curve on the compressor cover and a flat bearing housing provides good performance. For example, it has been found that under a variety of conditions a turbocharger with an elliptical diffuser provides a higher compressor pressure ratio (outlet pressure divided by inlet pressure) than various straight diffuser designs. In addition, the compressor efficiency of a turbocharger having an elliptical diffuser is higher than the compressor efficiency of turbochargers having straight diffusers.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
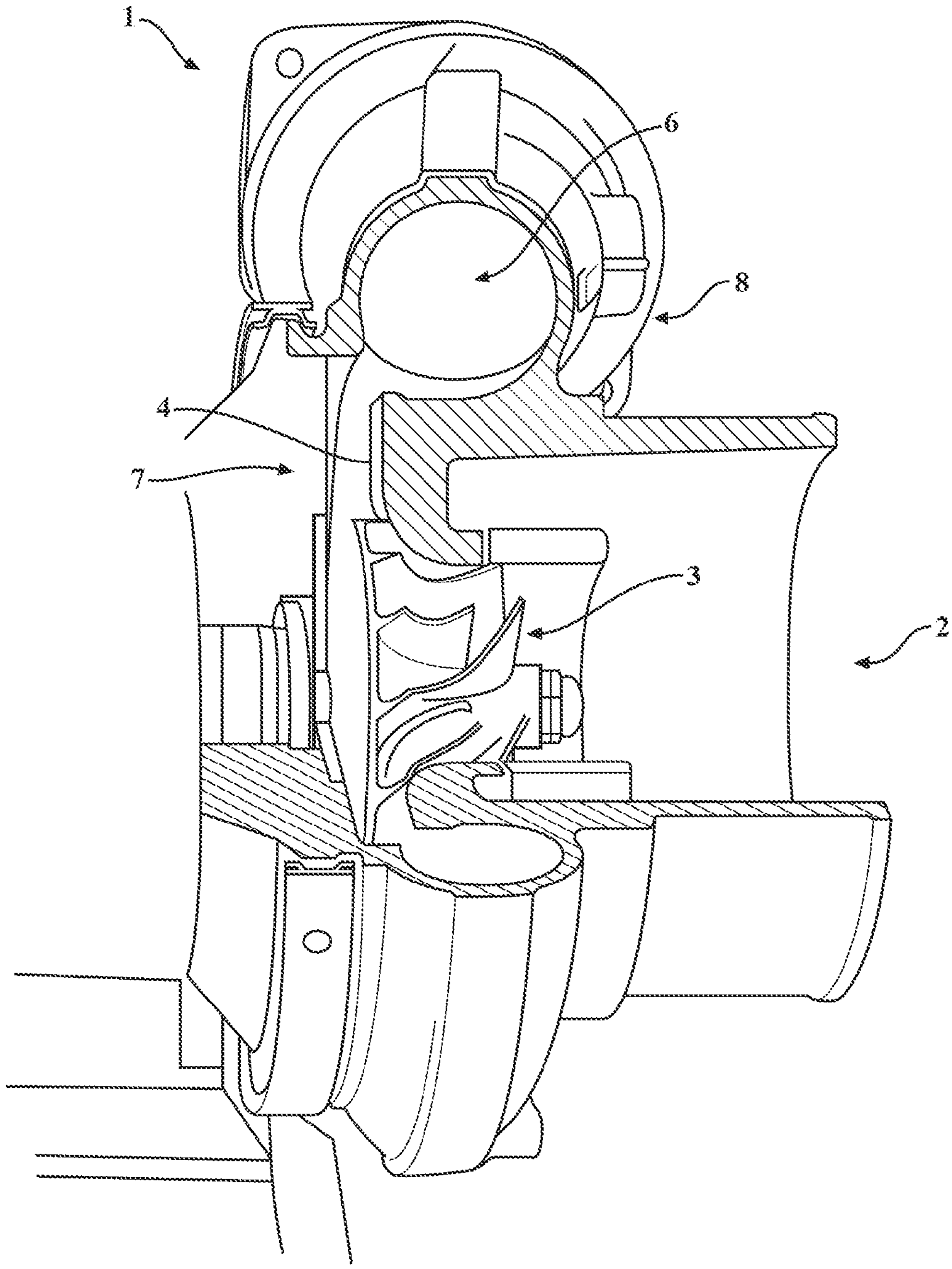
FIG. 1 Prior Art
FIG. 1 shows a conventional turbocharger compressor housing having a straight diffuser wall section. It is not an illustration of the present invention.

FIG. 1 shows the compressor portion 1 of a conventional turbocharger. The compressor portion 1 has an air inlet 2, a compressor wheel 3, a straight diffuser 4, a volute 6, a bearing housing 7, and a compressor housing 8.

Figure 2:
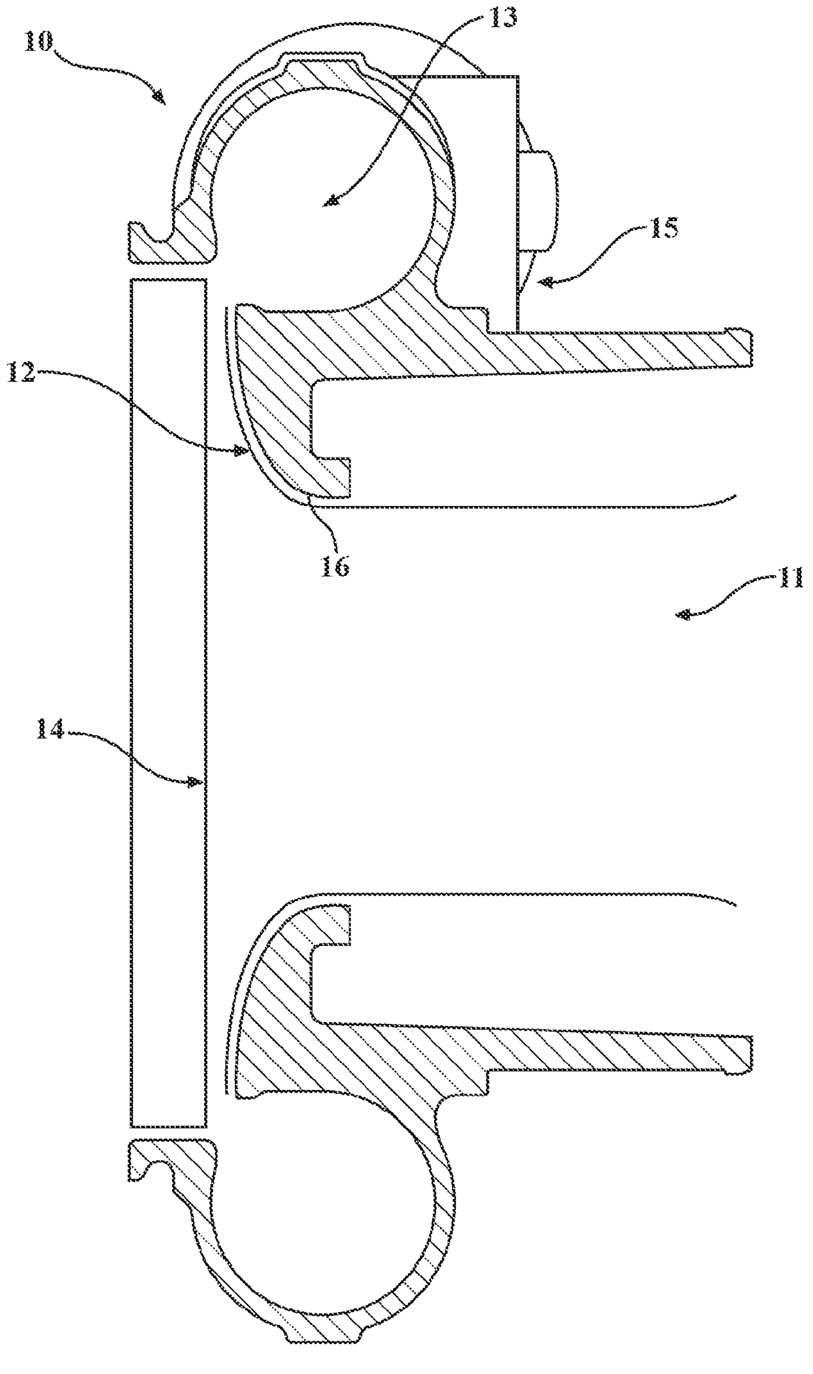
FIG. 2 shows a turbocharger compressor housing having a diffuser wall section with an elliptical shape and thus a gradual pinch. It is an illustration of the present invention. The compressor wheel and the turbine shaft are not shown.
Figure 3:
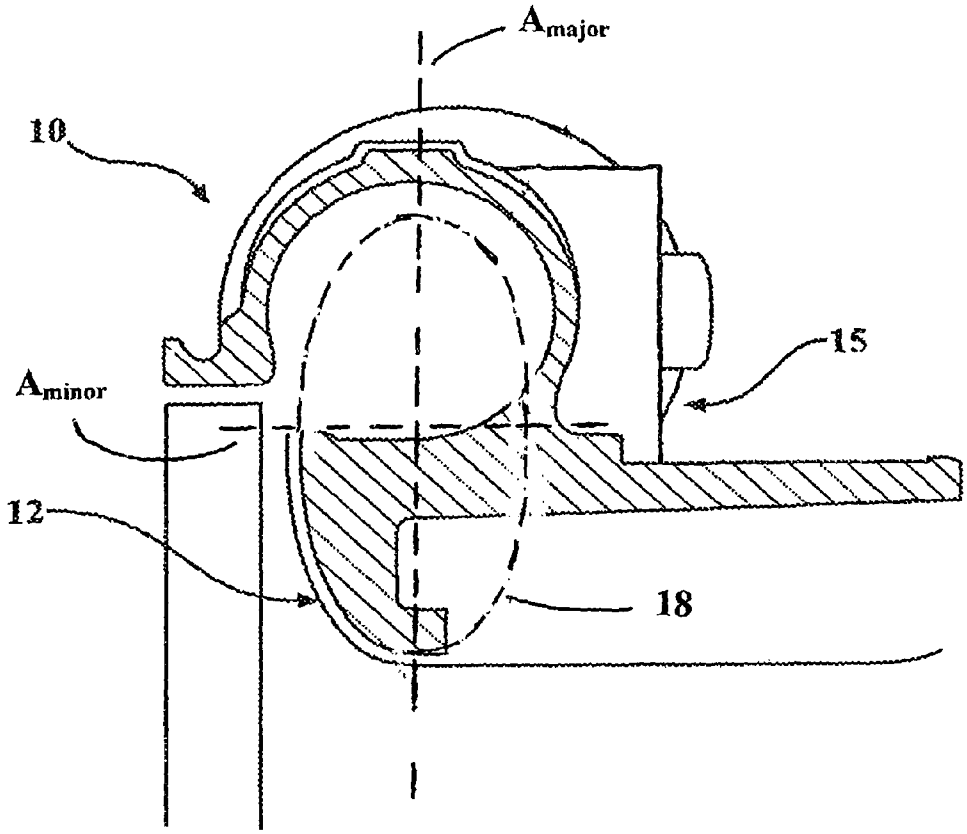
FIG. 3 shows the major and minor axis of the ellipse defining the elliptical shape of the compressor housing diffuser wall section.

FIG. 2 shows a compressor portion of a turbocharger 10 according to one embodiment of the invention. The compressor portion has an air inlet 11, an elliptical diffuser with a gradual pinch 12, a volute 13 a bearing housing having a straight, or flat, bearing housing diffuser wall 14, and a compressor housing 15. The compressor wheel and the turbine shaft are not shown. The elliptical diffuser 12 is formed by the compressor housing 15 which has an elliptical wall 16 and the flat wall of the bearing housing 14. The diffuser 12, therefore, has an elliptical wall and an opposing flat wall. As illustrated in FIG. 3, the major axis $A_{major}$ of the ellipse may be either close to parallel to the face of the bearing housing wall 14 or extend away from perpendicular to the bearing housing wall 14. The axes need not be exactly parallel or perpendicular to the bearing housing wall 14.

The ratio of the major $A_{major}$ and minor $A_{minor}$ axes influences the shape and length of the diffuser 12. If the major axis $A_{major}$ of the ellipse is directed away from the face of the bearing housing wall 14 and if the major axis $A_{major}$ is much longer than the minor axis $A_{minor}$, then the ellipse will be more pointed and the diffuser 12 will be curved and rather short. On the other hand, if the major $A_{major}$ and minor axes $A_{minor}$ are close in length the diffuser 12 will be less curved and longer. In this configuration a ratio of the major axis $A_{major}$ to the minor axis $A_{minor}$ of between 2:1 and 20:1 is generally appropriate.

The performance of a turbocharger compressor may be assessed by measuring the optimum compressor pressure ratio, and the optimum compressor efficiency. Testing can be performed on a calibrated turbocharger performance gas stand, which, with few exceptions, is consistent with the "Turbocharger Gas Stand Test CodeSAE J1826 and the SAE Turbocharger Nomenclature and TerminologySAE J922 Recommended Practice."

EXAMPLE 1

A baseline turbocharger having a 71 mm diameter compressor wheel was constructed utilizing a conventional, straight diffuser and was gas stand performance tested. At a speed of 129,000 rpm, and a flow range between 0.22-0.33 kg/s, the turbocharger produced an average pressure ratio of 3.02 and a baseline efficiency curve. A second turbocharger was constructed and gas stand performance tested with a different compressor cover having an elliptical diffuser with an axis ratio of approximately 7:1. This second turbocharger, tested within the same speed and flow range, produced an average increase in pressure ratio over the baseline of 0.06 and an average increase in compressor efficiency of 2%.

Any numerical range recited herein is intended to include all sub-ranges subsumed therein. For example, a range of "2:1 to 20:1" is intended to include any and all sub-ranges between and including the recited value of 2:1 and the recited value of 20:1.

What is claimed is:

1. A turbocharger (10) comprising:

a compressor housing (15) including:

a compressor wall section (16) for housing a compressor wheel;

a volute (13);

a diffuser, wherein the diffuser has a diffuser compressor wall section extending between the compressor wall section (16) and the volute (13);

a bearing housing (17) including a flat bearing housing wall (14) situated opposite to the diffuser compressor wall section;

wherein a portion of the diffuser compressor wall section (16) has an elliptical shape with a major axis of the elliptical shape parallel to the flat bearing housing wall (14) and a minor axis perpendicular to the flat bearing housing wall (14).

2. The turbocharger according to claim 1, wherein the ratio of the major axis to the minor axis is within a range of 2:1 to 20:1.

3. The turbocharger according to claim 1, wherein the ratio of the major axis to the minor axis is within a range of 5:1 to 15:1.

4. The turbocharger according to claim 1, wherein the ratio of the major axis to the minor axis is within a range of 5:1 to 10:1.

5. The turbocharger according to claim 1, wherein the ratio of the major axis to the minor axis is within a range of 6:1 to 8:1.

6. The turbocharger according to claim 1, wherein the ratio of the major axis to the minor axis is 7:1.

* * * * *